United States Patent [19]
Robinson

[11] 3,791,006
[45] Feb. 12, 1974

[54] BALL JOINT PULLER
[76] Inventor: Paul E. Robinson, 107-1301 Rothesay St., Winnipeg, Manitoba, Canada
[22] Filed: Aug. 23, 1972
[21] Appl. No.: 283,157

[52] U.S. Cl. .................................................. 29/201
[51] Int. Cl. ............................................. B23p 19/04
[58] Field of Search.... 29/149.5 B, 441, 201, 200 D

[56] References Cited
UNITED STATES PATENTS
3,008,226  11/1961  Kellerman ............................. 29/201
3,266,134  8/1966  Moskovitz ....................... 29/149.5 B Primary Examiner—Thomas H. Eager
Attorney, Agent, or Firm—Stanley G. Ade

[57] ABSTRACT

A cylindrical cone element is placed over the ball joint aperture and the ball joint assembly is offered up into the aperture from the underside. One or more of a variety of adaptors is then placed over the screw fitted shank of the ball joint assembly and rests upon the conical surface of the cylindrical cone element whereupon a nut can be engaged with the screw fitted shank and tightened down upon the adaptor thus pulling the ball joint assembly up into engagement within the walls of the aperture. The conical surface enables a straight pull to be exerted even if the cylindrical element cannot be aligned exactly at right angles to the longitudinal axis of the ball joint assembly due to constructional characteristics of the arm carrying the ball joint assembly.

9 Claims, 8 Drawing Figures

Patented Feb. 12, 1974

3,791,006

BALL JOINT PULLER

BACKGROUND OF THE ASSEMBLY:

This invention relates to new and useful improvements in pullers designed to install ball joint assemblies within control arms or the like of automobiles, or any vehicle utilizing conventional steering mechanisms.

Conventionally such ball joint assemblies are normally hammered into position and sometimes the control arm is heated to expand same, it being understood that the ball joint assembly is held frictionally within the aperture so that an extremely tight fit is necessary.

Unfortunately the heating of the arm often destroys the temper and as more and more ball joint assemblies are being made with nylon bearing surfaces, the transfer of heat to the ball joint assembly will often destroy or distort these surfaces.

Complicated hydraulic pullers are sometimes used but these are difficult to get into position upon a ball joint arm without dismantling a fair amount of the front wheel assembly in order to locate same properly.

The present invention overcomes all of these disadvantages by providing a relatively simple yet effective ball joint puller which can be used in relatively small or confined areas and can pull the ball joint into position without the necessity of heating the control arm.

The principal object and essence of the invention is therefore to provide a device of the character herewithin described which enables ball joint assemblies to be pulled into place within the ends of control arms without the necessity of dismantling associated equipment.

A yet further object of the invention is to provide a device of the character herewithin described which operates without the use of hydraulics or other pneumatic types of equipment.

A still further object of the invention is to provide a device of the character herewithin described which includes means to enable same to be used on the majority of pressed-in type ball joint assemblies manufactured regardless of the shank length.

A still further object of the invention is to provide a device of the character herewithin described in which a straight pull can be used upon the ball joint assembly even although the upper surface of the control arm may be uneven.

Still another object of the invention is to provide a device of the character herewithin described which is simple in construction, economical in manufacture, and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:-

BRIEF DESCRIPTION OF THE DRAWINGS

In the drawings like characters of reference indicate corresponding parts in the different figures.

DETAILED DESCRIPTION

Figure 1:
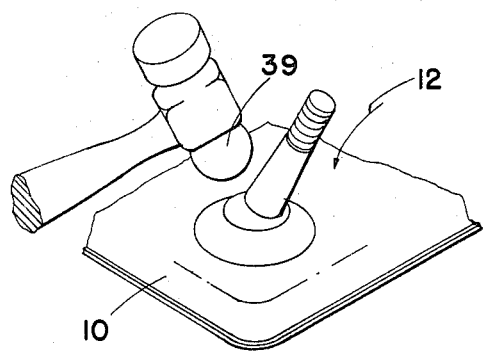
FIG. 1 shows a view of a ball joint being removed.

Proceeding therefore to describe the invention in detail, reference character 10 illustrates generally control arm having an aperture 11 formed therethrough within which a conventional ball joint assembly collectively designated 12, is positioned and held tightly by the frictional engagement of the wall of the aperture with the assembly.

The ball joint assembly includes a substantially cylindrical body portion 13 having a stepped base 14 and a ball 15 journalled for universal movement within the body portion, said ball having a tapered shank 16 extending upwardly therefrom terminating in a parallel screw threaded portion 17 upon which a nut 18 is engaged to hold a spindle or the like (not illustrated).

Figure 4:
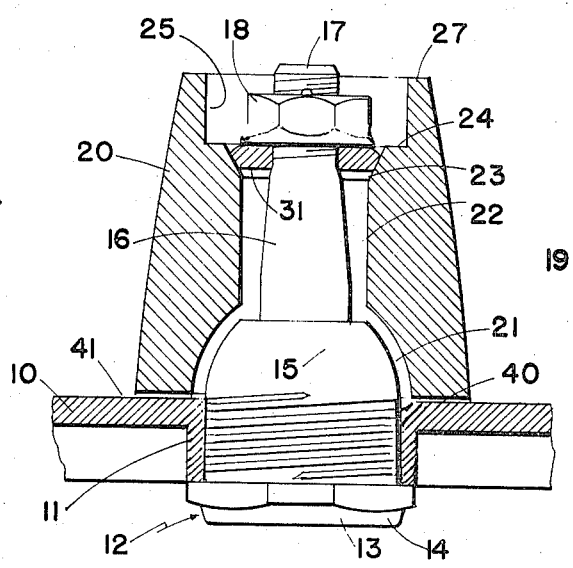
FIG. 4 is an enlarged cross sectional view of a ball joint assembly and the device to pull same into position.
Figure 5:
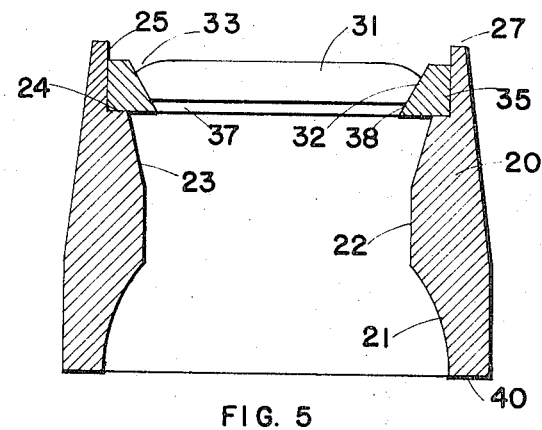
FIG. 5 is an enlarged cross sectional view of the body portion of the invention showing one of the adaptors thereon.

The invention collectively designated 19 consists of a substantially cylindrical shell or body portion 20 having a hollowed out curved base 21 so that it will fit over the upper portion of the body 13 of the ball joint assembly when in the installed position shown in FIG. 4.

The bore through the body 20 then extends for a portion indicated by reference character 22 and then inclines or flares outwardly in the form of a frusto-conical portion 23 the upper end of which is stepped upwardly to form a horizontal ledge 24. The bore then terminates with the parallel sided portion 25 extending to the upper side 27 of the body or shell 20.

A plurality of adaptors are provided to suit various arrangements of ball joint assemblies and varying shank lengths thereof.

Figure 6:
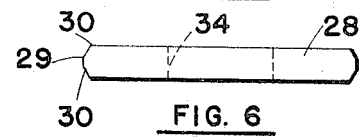
FIG. 6 is a side elevation of another of the adaptors.

FIG. 6 shows one adaptor which takes the form of a cylindrical washer 28 the perimetrical wall 29 of which is chambered on the upper and lower side as clearly illustrated by reference character 30.

Figure 7:
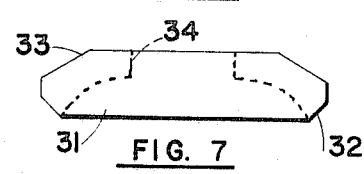
FIG. 7 is a side elevation of a still further type of adaptor.

FIG. 7 shows another form of adaptor specifically designated 31 which is also cylindrical in general configuration and is provided with a chamfered perimetrical lower wall portion 32 and a convexly curved upper wall portion 33, it being understood that both of the adaptors 28 and 32 are provided with a bore 34 therethrough of a size sufficient to enable same to engage over the shank or screw threaded portion 17 of the ball joint assembly as will hereinafter be described.

Figure 8:
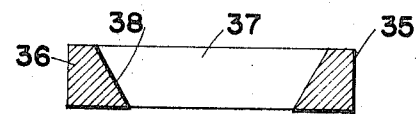
FIG. 8 is a cross sectional view of still another adaptor.

FIG. 8 shows a still further adaptor 35 having a substantially vertical perimetrical wall 36, said adaptor also being in the form of a cylindrical washer. However the internal bore 37 of this particular adaptor is provided with a frustoconical inner wall surface 38 of a diameter larger than the bore 34 hereinbefore described.

Figure 2:
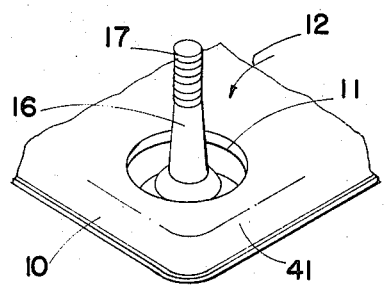
FIG. 2 shows a view of the arm with the new ball joint, partially inserted.
Figure 3:
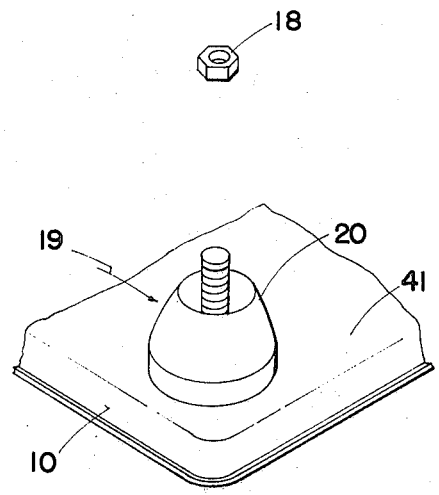
FIG. 3 is a view similar to FIG. 2 but showing the invention installed ready to pull the ball joint assembly into position.

In operation reference should be made to FIGS. 1, 2 and 3.

The associated equipment is removed from the ball joint assembly 12 and same is hammered out of the control arm 10 by means of the ball portion 39 of a conventional ball pane hammer.

The new assembly 12 is then offered up to the underside of the control arm as shown in FIG. 2 with the shank assembly extending through the aperture 11 in the control arm.

The body portion 20 of the puller 19 is then placed over the shank of the ball joint assembly so that the lower side 40 of the body portion rests upon the upper surface 41 of the control arm.

The necessary adaptor 28 or 31 is then placed over the shank and engaged within the frusto-conical surface 23 of the body portion 20 and a nut 18 screw threadably engaged with the screw fitted portion 17.

The nut is then tightened downwardly thus causing the ball joint assembly to be pulled into position within the aperture 11 readily and easily.

If necessary the underside of the ball joint assembly may be tapped with a hammer in order to align same, but the frustoconical surface 23 together with the chamfered perimetrical walls of the adaptor being used, enables a straight pull to be made along the longitudinal axis of the ball joint assembly even if the puller 19 is not exactly at right angles to the longitudinal axis due to imperfections or construction or characteristics of the upper surface 41 of the control arm.

The convex side of the adaptor 33 enables this particular adaptor to be seated lower down the walls of the frustoconical portion so that the initial pull can be made and then the nut can be removed and this adaptor turned over thus giving additional depth of threads to be used for pulling the ball joint assembly fully into position.

In the event that the ball joint assembly is provided with a relatively long shank, the adaptor 35 shown in FIG. 8 may be used.

This adaptor is seated upon the stepped horizontal ledge 24 of the body portion whereupon either the washer 28 or the adaptor 31 may be engaged within the frusto-conical inner surface 38 of the adaptor 35 and the puller operated as hereinbefore described.

It will of course be appreciated that a plurality of adaptors of the general characteristics illustrated may be used depending upon the shank length and the distance the ball joint assembly has to be moved in order to install same. Also the bores 34 of the adaptors may be varied to suit different diameters of screw threaded portion 17 of various wall joint assemblies.

An impact type wrench is used to ensure that the ball joint assembly is pulled fully into position as shown in FIG. 4.

Various modifications may be constructed or performed within the scope of the inventive concept disclosed. Therefore what has been set forth is intended to illustrate such concept and is not for the purpose of limiting protection to any herein particularly described embodiment thereof.

What I claim as my invention is

1. A puller for ball joint assemblies in which said ball joint assembly includes a cylindrical body, a ball mounted for universal movement in said body and a screw fitted shank extending from said ball, said ball joint assembly being mountable in an aperture in the associated control arm or the like; said puller comprising in combination a substantial cylindrical portion engageable over the shank of said ball joint assembly and engageable with one side of the arm within which said ball joint assembly is to be installed, a frusto-conical surface formed in the upper side of said cylindrical portion and at least one adaptor engaging over the shank of said ball joint assembly and within said frusto-conical surface.

2. The puller according to claim 1 in which said adaptor takes the form of a hardened steel washer, the perimetrical wall of which is chamfered.

3. The puller according to claim 1 in which said adaptor takes the form of a hardened steel washer having an arcuately curved upper surface and a perimetrical wall, said wall being chamfered around the lower side thereof.

4. The puller according to claim 1 in which said substantially cylindrical portion includes a hollowed out base adapted to receive the upper portion of the cylindrical body of said ball joint assembly when same is pulled into the installed position by said puller.

5. The puller according to claim 2 in which said substantially cylindrical portion includes a hollowed out base adapted to receive the upper portion of the cylindrical body of said ball joint assembly when same is pulled into the installed position by said puller.

6. The puller according to claim 3 in which said substantially cylindrical portion includes a hollowed out base adapted to receive the upper portion of the cylindrical body of said ball joint assembly when same is pulled into the installed position by said puller.

7. The puller according to claim 4 in which said substantially cylindrical portion includes a stepped shoulder portion above said frusto-conical surface, and further adaptor means engageable therein, said further adaptor means comprising a cylindrical washer having a frusto-conical inner wall.

8. A puller for ball joint assemblies comprising in combination a hollow body portion, a frusto-conical surface formed internally adjacent the upper end of said body portion and at least one adaptor engageable with said frusto-conical surface, said adaptor comprising a cylindrical steel washer, the perimetrical wall of which is chamfered.

9. The puller according to claim 8 in which the upper surface of said washer is convex.

* * * * *